United States Patent [19]

Oliver et al.

[11] Patent Number: 5,024,463
[45] Date of Patent: Jun. 18, 1991

[54] MANUALLY POWER MECHANICAL ACTUATOR FOR PARALLEL AUXILIARY SPRING

[75] Inventors: James L. Oliver, Pontiac; James A. Juriga, Bloomfield Hills; Erlen B. Walton, Farmington Hills; David M. Preston, Drayton Plains, all of Mich.

[73] Assignee: Eaton Corporation, Cleveland, Ohio

[21] Appl. No.: 456,872

[22] Filed: Dec. 26, 1989

[51] Int. Cl.⁵ .................. B60G 11/02; B60G 11/00
[52] U.S. Cl. .................................. 280/718; 280/715; 267/260
[58] Field of Search ............ 267/52, 45, 44, 48, 267/260, 265, 32, , 36.1, 41; 280/710, 715, 712, 718, 708, DIG. 1

[56] References Cited

U.S. PATENT DOCUMENTS

| | | | |
|---|---|---|---|
| 1,362,037 | 12/1920 | Peterson | 267/45 |
| 1,564,088 | 1/1925 | Matthews | 267/28 |
| 2,632,639 | 3/1953 | Proske | 267/28 |
| 2,714,003 | 7/1955 | Focht | 267/45 |
| 2,825,578 | 3/1958 | Walker | 280/715 |
| 3,430,976 | 3/1969 | Vautier | 280/718 |
| 3,484,901 | 12/1969 | Draves | |
| 3,869,140 | 3/1975 | Allison | 267/54 |
| 4,397,478 | 8/1983 | Jensen et al. | 280/711 |
| 4,456,232 | 6/1984 | Shinbori et al. | 267/260 |

FOREIGN PATENT DOCUMENTS

| | | | |
|---|---|---|---|
| 1515 | 1/1986 | Japan | 267/48 |
| 113508 | 5/1986 | Japan | 267/48 |

*Primary Examiner*—Richard A. Bertsch
*Attorney, Agent, or Firm*—P. S. Rulon

[57] ABSTRACT

Selectively engagable auxiliary leaf springs (38 or 142) for vertically supporting a vehicle chassis (32) on an axle assembly (22 or 102) in parallel with main suspension springs (34 or 114). In three of the disclosed embodiments, both ends (38b,38a) of the auxiliary leaf springs (38) are pivotally attached. In two other embodiments, one end (142a) of each auxiliary leaf spring (142) is pivotally attached and the other end (142b) is rigidly affixed in cantilever fashion. A manually operated hand crank (60) or ratchet mechanism (87) employed to drive a speed reducer actuator (62) to selectively enable or increase load supporting of the auxiliary leaf springs.

25 Claims, 3 Drawing Sheets

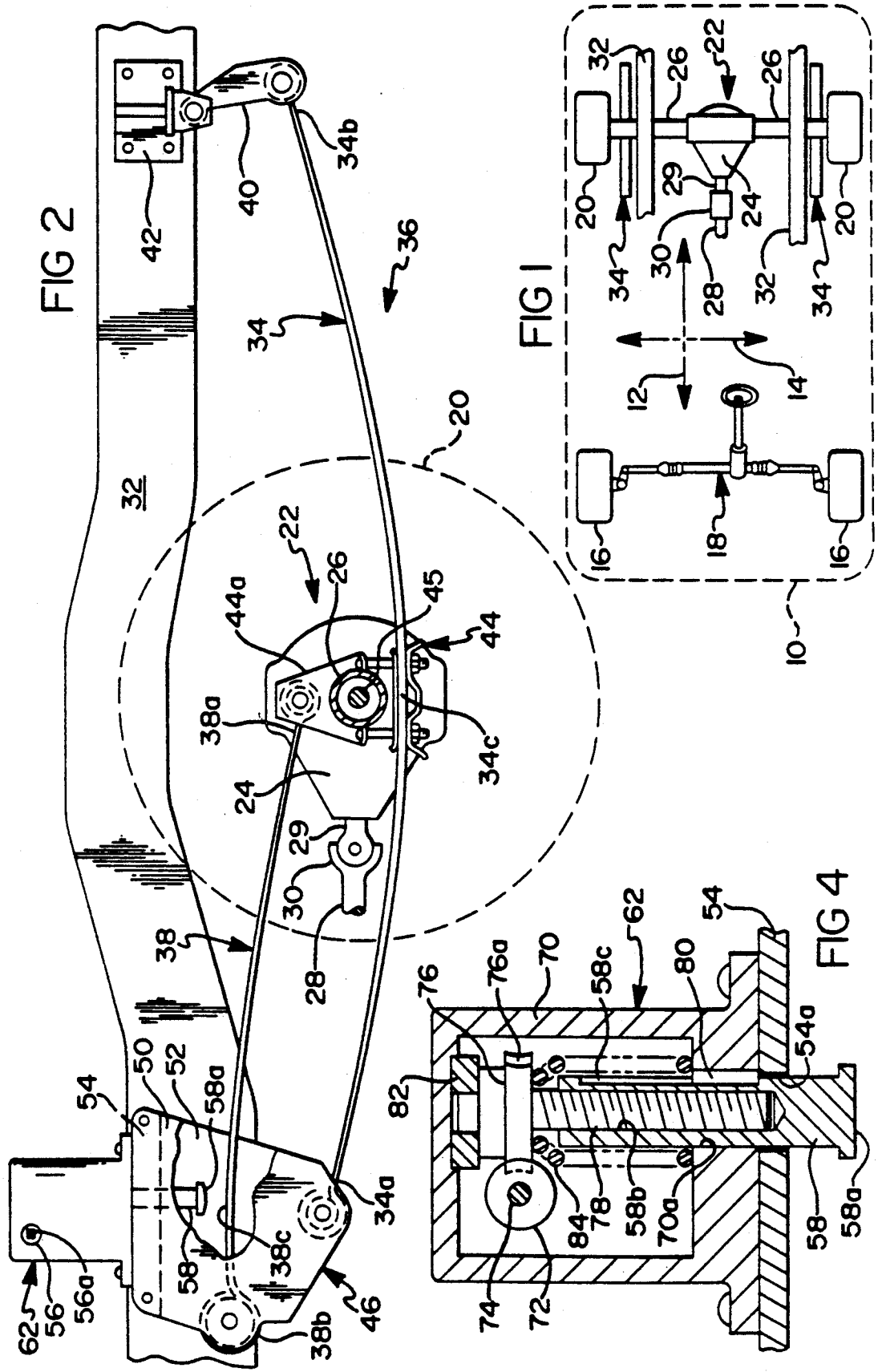

FIG 2A
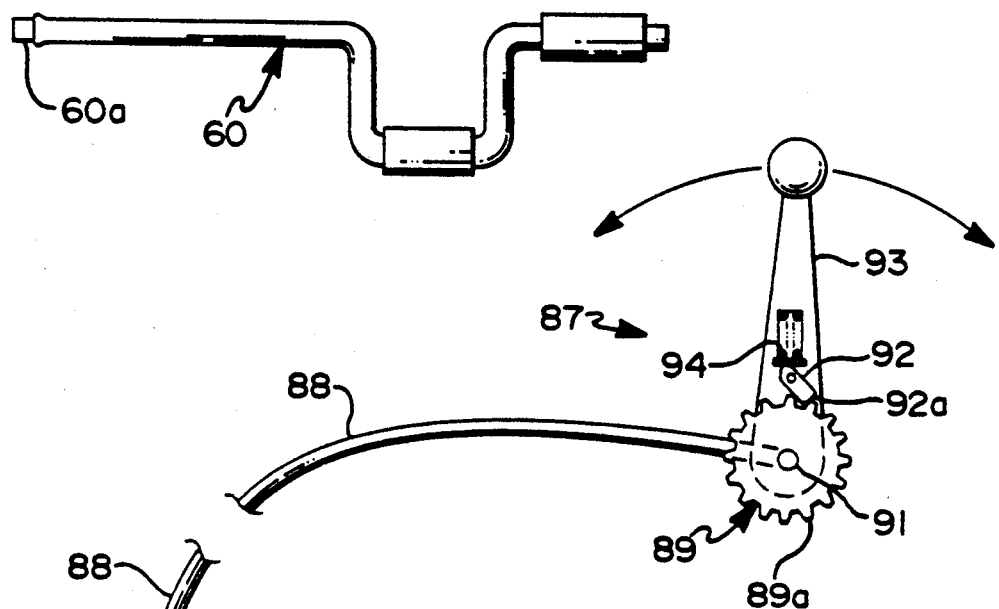
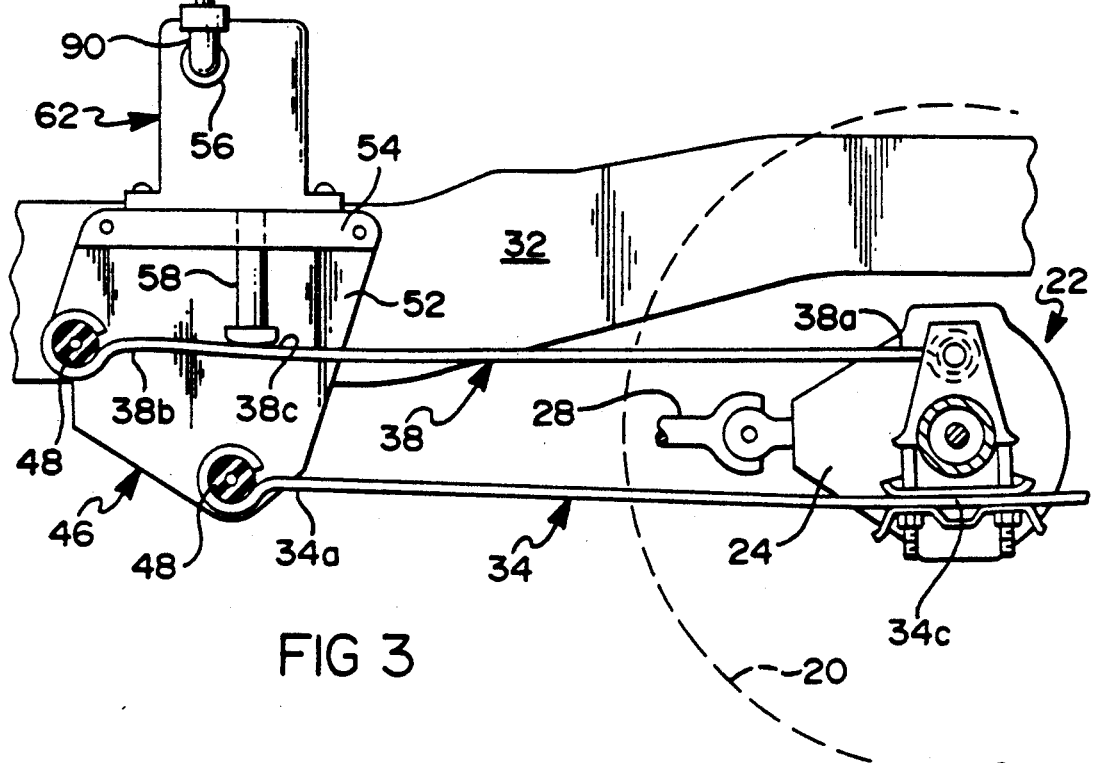
FIG 3

MANUALLY POWER MECHANICAL ACTUATOR FOR PARALLEL AUXILIARY SPRING

CROSS-REFERENCE TO RELATED APPLICATION

This application is related to U.S. Application Ser. Nos. 07/466,914, 07/457,025, 07/457,026, 07/457,056 07/456,068; 07/457,069; all filed the same date as this application; all assigned to the assignee of this application; and all incorporated herein by reference.

FIELD OF THE INVENTION

This invention relates to auxiliary or helper springs for vehicle suspension systems. More particularly, this invention relates to auxiliary leaf springs having selectively varied spring rate and which also functions as traction links.

BACKGROUND OF THE INVENTION

Selectively engagable auxiliary leaf springs are known in the prior art as may be seen by reference to U.S. Pat. No. 3,484,091 to Draves, and incorporated herein by reference. The Draves patent discloses left and right ground engaging wheels rotatably mounted on opposite ends of an axle assembly extending transverse to a longitudinal axis of a vehicle chassis, left and right main suspension springs of the leaf or coil type vertically supporting the chassis on the axle assembly, left and right generally longitudinally extending auxiliary leaf springs each having an end pivotally affixed to the chassis and a unaffixed or free end, and an actuator assembly selectively operative to move the free end into load supporting engagement with the axle assembly. Such an auxiliary spring arrangement allows the main suspension springs to be designed for ride comfort when the vehicle is unloaded or lightly loaded, and is particularly well suited for light duty utility vehicles such as pick-up trucks which are used more for commuting than load hauling. However, since the auxiliary leaf springs of Draves have an unattached or free end, they can only function to help support load and the free ends of the auxiliary springs can clash against the axle and produce annoying noise.

SUMMARY OF THE INVENTION

An object of the present invention is to provide an improved auxiliary leaf spring arrangement for a vehicle.

A further object of the present invention is to provide an auxiliary leaf spring which can function as a traction link, which can mitigate distortion of main leaf springs due to drive and/or braking torque, and which, when used with a drive axle having an unsprung differential, can readily control the drive angle between the vehicle drive shaft and the differential pinion shaft.

According to a feature of the invention, a vehicle comprises left and right ground engaging wheel mechanisms rotatably mounted on opposite ends of an axle assembly extending transverse to a longitudinal axis of a vehicle chassis assembly; main suspension springs vertically supporting the chassis on the axle assembly; first and second transversely spaced apart and generally longitudinally extending auxiliary leaf springs each having a first end attached to one of the assemblies and a second end disposed for reacting against the other assembly, the auxiliary leaf spring for vertically supporting the chassis on the axle assembly in parallel with the main spring means; and an actuator means affixed to one of the assemblies and selectively operative to position a reaction means between one assembly and a portion intermediate the ends of each auxiliary leaf spring for varying the amount of vertical support provided by the auxiliary leaf spring.

The invention is characterized by the actuator means including at least one speed reduction gear assembly disposed in a housing means affixed to the one assembly, the gear assembly including an input gear drivingly connected to a manually driven drive, an output gear driven by the input gear, the output gear drivingly connected to the reaction means and operative to move the reaction means into and out of contact with the portion of each auxiliary leaf spring in response to to-and-fro rotation of the manually driven drive.

BRIEF DESCRIPTION OF THE DRAWINGS

A vehicle suspension system employing the auxiliary leaf springs according to the invention is shown in the accompanying drawings in which:

FIG. 1 is a schematic plan view of a vehicle;

FIG. 2 is a side elevational view of the left rear portion of a suspension system having an auxiliary leaf spring pivotally attached at both ends;

FIG. 2A is a hand crank for an actuator of FIG. 2;

FIG. 3 is a partial view of FIG. 2 with a spring attachment plate removed to illustrate forward mounting of the main and auxiliary leaf spring ends and with an alternative hand operated mechanism for the actuator;

FIG. 4 is an elevational-sectional view of an actuator speed reducer for engaging and disengaging the auxiliary leaf spring of FIGS. 2 and 3;

DETAILED DESCRIPTION OF THE DRAWINGS

Figure 6:
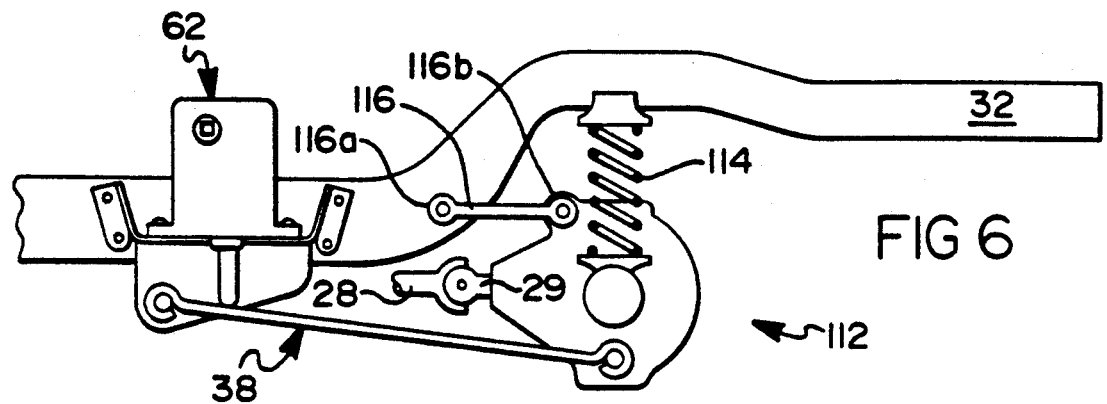
FIGS. 5 and 6 illustrate the auxiliary leaf spring employed with somewhat different suspension systems.

The schematic plan view of FIG. 1 illustrates a wheeled vehicle having a body represented by phantom line 10, longitudinal and transverse axes 12, 14, left and right front wheels 16, a steering assembly 18, for the front wheels, left and right rear wheels 20 rotatably supported on opposite ends of a rigid and transversely extending drive axle assembly 22, having a differential gear assembly disposed in a differential housing 24 rigidly affixed to transversely extending tube portions 26, an engine driven drive shaft 28 connected to the differential gear assembly pinion shaft 29 by a flexible joint such as a universal joint 30 shown in FIG. 2, partially shown chassis rails 32, and first and second longitudinally extending main leaf springs 34 each having opposite ends 34a, 34b in load supporting relation (see FIG. 2) with the chassis rails and each having an intermediate portion 34c affixed to the axle assembly. For purposes of the present invention, the axle assembly 22 may be a rigid drive or non-drive axle, may support the chassis on other than leaf springs 32 (e.g., coil springs), may be other than rigid (e.g., an axle assembly for independent wheel suspension), or may be other than a rear axle.

Looking now at FIGS. 2 and 3, therein is shown a suspension embodiment 36 of the present invention for the left side of axle assembly 22. The right side is the same and is not shown for brevity. Embodiment 36 includes a known, underslung main leaf spring suspension modified to include an auxiliary or helper leaf spring 38 which is selectively engagable to vertically support the vehicle chassis in parallel with main leaf spring 34, which functions as a traction link, which mitigates distortion of the main leaf spring due to drive and braking torque, and which readily controls angular changes in the drive angle between drive and pinion shafts 28, 29 due to distortion of main leaf spring 34 and variations in the relative vertical positions of the chassis and axle assembly.

The rear end 34b of spring 34 is pivotally attached to chassis rail 32 in known manner by a shackle and bracket 40, 42. A bracket assembly 44 rigidly affixes intermediate portion 34c to the underside of axle tube 26 at a position radially spaced from the rotational and transversely extending axis of a stub shaft 45 drivingly interconnecting wheel 20 and the differential. Bracket assembly 44 includes a pair of upwardly extending and transversely spaced apart flanges 44a (only one shown) for pivotally affixing an end 38a of auxiliary leaf spring 38 to the axle assembly at a position diametrically opposite spring portion 34c. The front or forward ends 34a and 38b of the main and auxiliary leaf springs are pivotally attached to a bracket assembly 46 rigidly affixed to chassis rail 32. The pivotal attachments of the main and auxiliary spring ends may include elastomeric bushings 48 in known manner as shown in FIG. 3.

Bracket assembly 46 includes transversely spaced apart side plates 50, 52 and an upper plate 54 rigidly affixed to and spacing the side plates apart. Side plate 50 is partially broken away in FIG. 2 to show side plate 52 and is cut away in FIG. 3. Upper bracket plate 54 provides a mounting surface for a speed reducer actuator assembly 62 operative to move a surface 58a of a reaction member 58 into and out of engagement with an upper surface portion 38c of auxiliary leaf spring 38. When surfaces 58a, 38c are spaced apart, as shown in FIG. 2, auxiliary leaf spring end 38b is free to pivot and main leaf spring 38 provides sole load support for the chassis. When the surfaces are engaged, as shown in FIG. 3, pivotal movement of end 38b is prevented or inhibited and the auxiliary spring shares load support of the chassis in parallel with main leaf spring 34.

Since auxiliary leaf spring 38 is pivotally affixed at its ends 38b, 38a to the chassis and the axle assembly and since the auxiliary leaf spring between ends 38b, 28a is generally in spaced parallel relation to the portion of main leaf spring 34 between end 34a and intermediate portion 34c, it also functions as a drag or traction link which mitigates distortion of main leaf spring 34 due to drive and/or braking torque and which readily controls angular changes in drive angle between drive and pinion shafts 28, 29 due to main leaf spring distortion and variation in the relative vertical positions of the chassis and axle assembly. Such drive angle changes are readily controlled by varying the length of the auxiliary leaf, e.g., shortening auxiliary leaf spring 38 in embodiment 36 will provide a nose down attitude of pinion shaft 29 as the vertical distance between chassis and axle assembly decreases due to increased load on the chassis or jounce of the axle assembly. Main leaf spring 34 may be of the single or multiple leaf type. Since auxiliary leaf spring 38 is attached at both ends, it also is effective to maintain the axle assembly in position should the main leaf spring break.

Assembly 62, which is shown in vertical section in FIG. 4, includes a housing 70 rigidly affixed to upper plate 54, a worm 72 mounted for rotation in the housing about the axis of a shaft 74 drivingly connected to a rotatably mounted input drive 56 (FIG. 2) having a socket 56a for receiving a drive end 60a of a hand crank 60. The worm includes unshown teeth in mesh with partially shown teeth 76a of a worm gear 76 which is affixed to a screw 78 threadably received in a bore 58b of reaction member 58. Reaction member 58 slidably extends through a bore 70a in housing 70 and through an opening 54a in upper plate 54. A seal or boot may be provided to exclude ingress of foreign matter along the interface of member 58 and bore 70a. Rotation of the reaction member is prevented by an elongated keyway 58c slidably received by a key 80 affixed to housing 70. The threaded relation between screw 78 and bore 58b provide a mechanism for linearly moving the reaction member into engagement with auxiliary spring portion 38c in response to rotation of gears 72, 76. Upward thrust acting on reaction member 58, screw 78 and worm gear 76 is reacted by housing 62 through a thrust bearing 82; these components are biased upward by a spring 84. Actuator assembly 56 may be any of several well known speed reducer assemblies capable of engaging reaction member 58 and sized for engaging the reaction member only prior to chassis loading requiring the auxiliary springs or capable (as herein) of engaging and varying the position of the reaction member under load.

Alternatively, as shown in FIG. 3, input drive 56 may be connected to a remotely located ratchet drive mechanism 87 via a flex cable 88 connected at one end to ratchet wheel 89 and the other end to the input drive 56 via a right angle drive 90. The ratchet wheel is fixed to a shaft 91 mounted for rotation and is manually driven by a reversible pawl 92 pivotally attached to an actuation handle 93 rotatably mounted on shaft 91. An end 92a of the pawl is resiliently biased by a spring 94 into engagement with circumferentially spaced apart ratchet teeth 89a on the outer periphery of the ratchet wheel.

Figure 5:
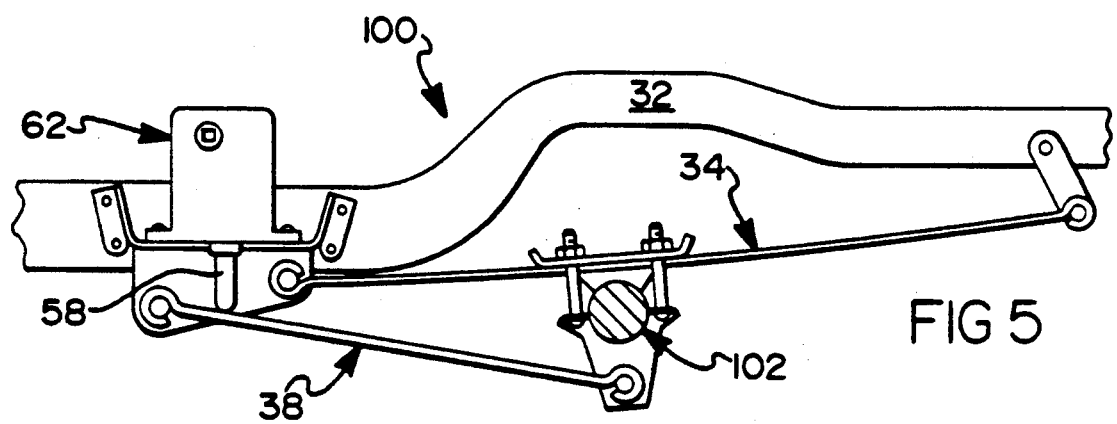

FIGS. 5 and 6 schematically illustrate alternative embodiments of main suspension springs in combination with the auxiliary leaf springs of FIGS. 2 and 3. In these embodiments like components will be identified by like reference numbers.

In the suspension embodiment 100 of FIG. 5 auxiliary leaf spring 38 is employed with an over slung main leaf spring 34 attached to the top of an axle assembly 102 which may be a rigid non-drive axle, as shown therein, or drive axle as in FIGS. 2 and 3. All of the actuator assemblies 62 disclosed herein may be driven by the hand crank of FIG. 2A or the ratchet mechanism of FIG. 3.

FIG. 6 schematically illustrates a suspension embodiment 112 wherein auxiliary leaf spring 38 and actuator assembly 62 are employed with a main suspension spring 114 of the coil type supporting the chassis on an axle assembly which may be of the drive or non-drive type. The embodiment of FIG. 6 includes a wishbone type link 116 pivotally attached at forward ends 116a to the chassis rails and at the rear end 116b to the axle assembly. Link 116 and auxiliary leaf spring 38 react against drive and braking torque and control the angular relation of drive and pinion shafts 28, 29 in the same sense as the main and auxiliary leaf springs in FIGS. 2 and 3. Accordingly, the relative lengths of spring 38 and link 116 may be varied to provide different angular relations.

Figure 7:
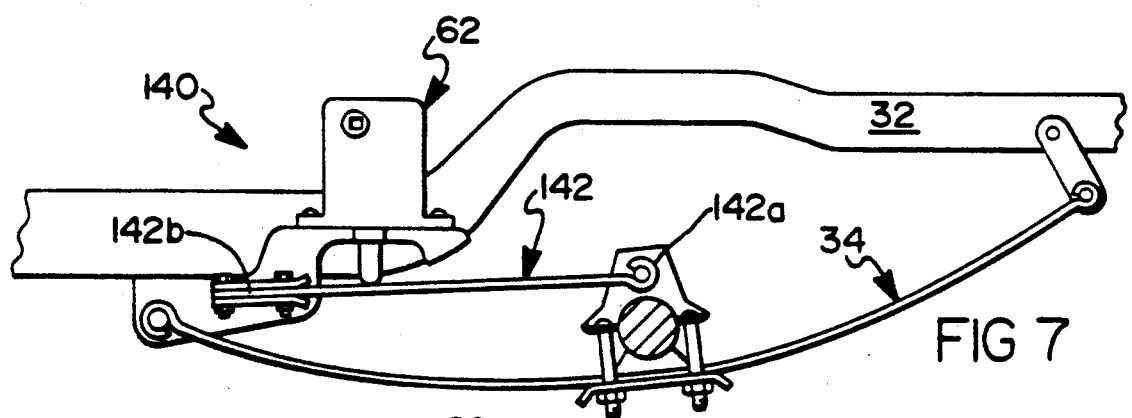
FIGS. 7 and 8 illustrate auxiliary leaf springs having one end affixed in cantilever fashion and the other end pivotally attached.
Figure 8:
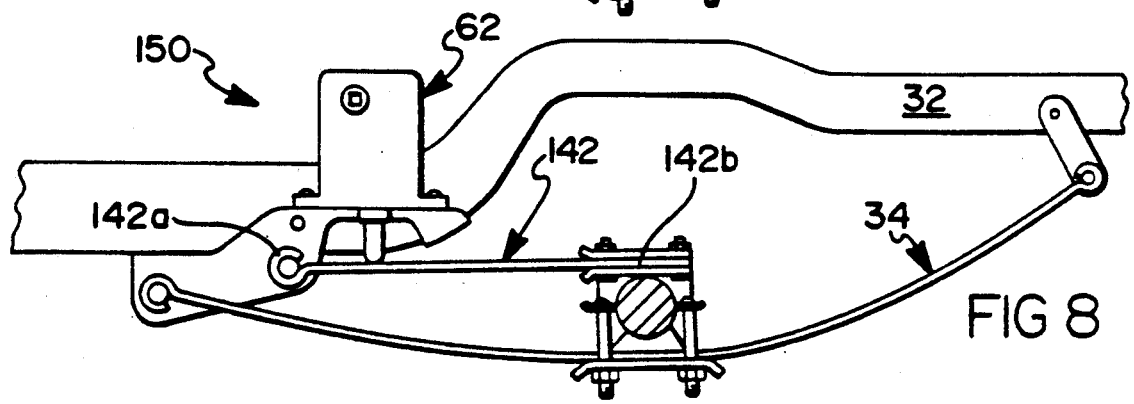

FIGS. 7 and 8 schematically illustrate alternative embodiments of the auxiliary leaf springs in combination with main suspension springs. The main suspension springs may be of the over or under slung leaf spring type 34 as respectively illustrated in FIG. 2 and 5, or they may be of the coil spring type illustrated in FIG. 6. In both embodiments of FIGS. 7 and 8, the auxiliary leaf springs are attached at both ends as in the previous described embodiments. In embodiment 140 of FIG. 7, the auxiliary leaf spring 142 has an end 142a pivotally attached to the axle assembly as previously described and an end 142b which is rigidly affixed to chassis in cantilever fashion. Accordingly, auxiliary leaf spring 142 is continuously operative to vertically support the vehicle chassis in parallel with the main suspension spring. The combined spring rate of the main suspension springs and auxiliary spring 142 may be selected for ride comfort when the vehicle is unloaded or lightly loaded. When the vehicle load is increased, actuator 62 may move reaction member 58 into contact with a portion 142c of spring 142, thereby shortening the active flex length to increase the effective rate of spring 142 and the percentage of load supported by spring 142.

In embodiment 150 of FIG. 8, the auxiliary leaf spring 142 has end 142a pivotally attached to the chassis and end 142b rigidly affixed to the axle assembly in cantilever fashion. This reversed attachment arrangement of the ends for a given spring rate of the auxiliary spring causes the auxiliary spring to be somewhat less effective until actuator 62 moves reaction member 58 into contact with the auxiliary leaf spring portion 142c.

Several embodiments of the invention have been disclosed for illustration purposes. Many variations of the disclosed embodiments are believed to be within the spirit of the invention. The following claims are intended to cover inventive portions of the disclosed embodiments and modifications thereof which are believed to be within the spirit of the invention.

What is claimed is:

1. A vehicle comprising left and right ground engaging wheel mechanisms rotatably mounted on opposite ends of an axle assembly extending transverse to a longitudinal axis of a vehicle chassis assembly having front and rear ends; main spring means vertically supporting the chassis assembly on the axle assembly, the main spring means include first and second transversely spaced apart and generally longitudinally extending main leaf springs each having opposite ends in load supporting relation with the chassis and each having an intermediate portion affixed to the axle assembly; first and second transversely spaced apart and generally longitudinally extending auxiliary leaf springs each having a first and a second end respectively attached to the chassis and axle assemblies, the auxiliary leaf springs for vertically supporting the chassis on the axle assembly in parallel with the main spring means; and an actuator means affixed to one of the assemblies and selectively operative to position a reaction means between the one assembly and a portion intermediate the ends of each auxiliary leaf spring for varying the amount of vertical support provided by the auxiliary leaf springs; characterized by:

the auxiliary leaf springs being of the single leaf type, bracket means rigidly affixed to the axial assembly for pivotally attaching the second ends of the auxiliary leaf springs and rigidly attaching the intermediate portions of the main leaf springs to opposite sides of the axial assembly relative to the vertical; and the actuator means includes at least one speed reduction gear assembly disposed in housing means affixed to the one assembly, the gear assembly including an input gear drivingly connected to a manually driven drive, an output gear driven by the input gear, the output gear drivingly connected to the reaction means and operative to move the reaction means into and out of contact with the portion of each auxiliary leaf spring in response to to-and-fro rotation of the manually driven drive.

2. The vehicle of claim 1, wherein at least one speed reduction gear assembly comprises first and second speed reduction gear assemblies respectively associated with the first and second auxiliary leaf springs, each gear assembly having the housing thereof affixed to the chassis assembly and each having linear drive means therein operative to linearly move the reaction means into and out of contact with the auxiliary leaf spring portion in response to to-and-fro rotation of the input and output gears.

3. The vehicle of claim 2, wherein the manually driven drive includes a hand crank.

4. The vehicle of claim 2, wherein the manually driven drive includes a ratchet mechanism mounted on the chassis assembly remote from the speed reduction gear assemblies, the ratchet mechanism including a ratchet wheel mounted for rotation about an axis and drivingly connected to the input gear of each gear assembly by rotatable flex cable means, a handle mounted for manual to-and-fro rotation about the axis, and a reversible pawl mounted for movement with the handle and engaging circumferentially spaced apart ratchet teeth of the ratchet wheel.

5. The vehicle of claim 1, wherein the main spring means include first and second transversely spaced apart and generally vertically extending coil springs, and the first ends of the leaf springs being pivotally affixed to the chassis assembly at positions forward of the axle assembly.

6. The vehicle of claim 5, wherein both ends of each auxiliary leaf spring are pivotally attached.

7. The vehicle of claim 6, wherein the at least one speed reduction gear assembly comprises first and second speed reduction gear assemblies respectively associated with the first and second auxiliary leaf springs, each gear assembly having the housing thereof affixed to the chassis assembly and each having linear drive means therein operative to linearly move the reaction means into and out of contact with the auxiliary leaf spring portion in response to to-and-fro rotation of the input and output gears.

8. The vehicle of claim 7, wherein the manually driven drive includes a hand crank.

9. The vehicle of claim 7, wherein the manually driven drive includes a ratchet mechanism mounted on the chassis assembly remote from the speed reduction gear assemblies, the ratchet mechanism including a ratchet wheel mounted for rotation about an axis and drivingly connected to the input gear of each gear assembly by rotatable flex cable means, a handle mounted for manual to-and-fro rotation about the axis, and a reversible pawl mounted for movement with the handle and engaging circumferentially spaced apart ratchet teeth of the ratchet wheel.

10. The vehicle of claim 5, wherein the first end of each auxiliary leaf spring is pivotally attached to the chassis assembly and the second end is attached to the axle assembly in cantilever fashion.

11. The vehicle of claim 5, wherein the second end of each auxiliary leaf spring is attached in cantilever fashion to the chassis assembly and the first end is pivotally attached to the axle assembly.

12. The vehicle of claim 11, wherein the at least one speed reduction gear assembly comprises first and second speed reduction gear assemblies respectively associated with the first and second auxiliary leaf springs, each gear assembly having the housing thereof affixed to the chassis assembly and each having linear drive means therein operative to linearly move the reaction means into and out of contact with the auxiliary leaf spring portion in response to to-and-fro rotation of the input and output gears.

13. The vehicle of claim 12, wherein the manually driven drive includes a hand crank.

14. The vehicle of claim 12, wherein the manually driven drive includes a ratchet mechanism mounted on the chassis assembly remote from the speed reduction gear assemblies, the ratchet mechanism including a ratchet wheel mounted for rotation about an axis and drivingly connected to the input of each gear assembly by rotatable flex cable means, a handle mounted for manual to-and-fro rotation about the axis, and a reversible pawl mounted for movement with the handle and engaging circumferentially spaced apart ratchet teeth of the ratchet wheel.

15. A vehicle comprising left and right ground engaging wheel mechanisms rotatably mounted on opposite ends of an axle assembly extending transverse to a longitudinal axis of a vehicle chassis assembly having front and rear ends; main spring means vertically supporting the chassis assembly on the axle assembly; first and second transversely spaced apart and generally longitudinally extending auxiliary leaf springs each having a first end attached to one of the assemblies and a second end disposed for reacting against the other assembly, the auxiliary leaf springs for vertically supporting the chassis assembly on the axle assembly in parallel with the main spring means; and an actuator means affixed to one of the assemblies and selectively operative to position a reaction means between the one assembly and a portion intermediate the ends of each auxiliary leaf spring for varying the amount of vertical support provided by the auxiliary leaf springs; characterized by;

the actuator means including at least one speed reduction gear assembly disposed in housing means affixed to the one assembly, the gear assembly including an input gear drivingly connected to a manually driven drive, an output gear driven by the input gear, the output gear drivingly connected to the reaction means and operative to move the reaction means into and out of contact with the portion of each auxiliary leaf spring in response to to-and-fro rotation of the manually driven drive, the one speed reduction gear assembly comprising first and second speed reduction gear assemblies respectively associated with the first and second auxiliary leaf springs, each gear assembly having the housing thereof affixed to the chassis assembly and each having linear drive means therein operative to linearly move the reaction means into and out of contact with the auxiliary leaf spring portion in response to to-and-fro rotation of the input and output gears, the manually driven drive including a ratchet mechanism mounted on the chassis assembly remote from the speed reduction gear assemblies, the ratchet mechanism including a ratchet wheel mounted for rotation about an axis and drivingly connected to the input gear of each gear assembly by rotatably flex cable means, a handle mounted for manual-to-and-fro rotation about the axis, and a reversible pawl mounted for movement with the handle and engaging circumferentially spaced apart ratchet teeth of the ratchet wheel.

16. The vehicle of claim 15, wherein the main spring means include first and second transversely spaced apart and generally longitudinally extending main leaf springs each having opposite ends in load supporting relation with the chassis assembly and each having an intermediate portion affixed to the axle assembly.

17. The vehicle of claim 16, wherein both ends of each auxiliary leaf spring are pivotally attached.

18. The vehicle of claim 17, wherein the at least one speed reduction gear assembly comprises first and second speed reduction gear assemblies respectively associated with first and second auxiliary leaf springs, each gear assembly having the housing thereof affixed to the chassis and each having linear drive means therein operative to linearly move the reaction means into and out of contact with the auxiliary leaf spring portion in response to to-and-fro rotation of the input and output gears.

19. The vehicle of claim 18, wherein the manually driven drive includes a hand crank.

20. The vehicle of claim 18, wherein the manually driven drive includes a ratchet mechanism mounted on the chassis remote from the speed reduction gear assemblies, the ratchet mechanism including a ratchet wheel mounted for rotation about an axis and drivingly connected to the input gear of each gear assembly by rotatable flex cable means, a handle mounted for manual to-and-fro rotation about the axis, and a reversible pawl mounted for movement with the handle and engaging circumferentially spaced apart ratchet teeth of the ratchet wheel.

21. The vehicle of claim 16, wherein the first end of each auxiliary leaf spring is pivotally attached to the chassis assembly and the second end is attached to the axle assembly in cantilever fashion.

22. The vehicle of claim 16, wherein the second end of each auxiliary leaf spring is attached in cantilever fashion to the chassis assembly and the first end is pivotally attached to the axle assembly.

23. The vehicle of claim 22, wherein the at least one speed reduction gear assembly comprises first and second speed reduction gear assemblies respectively associated with the first and second auxiliary leaf springs, each gear assembly having the housing thereof affixed to the chassis and each having linear drive means therein operative to linearly move the reaction means into and out of contact with the auxiliary leaf spring portion in response to to-and-fro rotation of the input and output gears.

24. The vehicle of claim 23, wherein the manually driven drive includes a hand crank.

25. The vehicle of claim 23, wherein the manually driven drive includes a ratchet mechanism mounted on the chassis assembly remote from the speed reduction gear assemblies, the ratchet mechanism including a ratchet wheel mounted for rotation about an axis and drivingly connected to the input gear of each gear assembly by rotatable flex cable means, a handle mounted for manual to-and-fro rotation about the axis, and a reversible pawl mounted for movement with the handle and engaging circumferentially spaced apart ratchet teeth of the ratchet wheel.

* * * * *